United States Patent [19]

Katsube et al.

[11] Patent Number: 4,610,074
[45] Date of Patent: Sep. 9, 1986

[54] AUTOMATIC TOOL CHANGER OF A MACHINE TOOL

[75] Inventors: Hideo Katsube, Hachioji; Toshiyuki Aso, Koganei, both of Japan

[73] Assignee: Fanuc Ltd., Tokyo, Japan

[21] Appl. No.: 499,152

[22] PCT Filed: Sep. 13, 1982

[86] PCT No.: PCT/JP82/00367

§ 371 Date: May 16, 1983

§ 102(e) Date: May 16, 1983

[87] PCT Pub. No.: WO83/01028

PCT Pub. Date: Mar. 31, 1983

[30] Foreign Application Priority Data

Sep. 14, 1981 [JP] Japan ................................ 56-145242

[51] Int. Cl.$^4$ ............................................. B23Q 3/157
[52] U.S. Cl. ..................................... 29/568; 29/26 A; 29/48.5 A; 408/35; 409/211
[58] Field of Search ............... 29/26 A, 40, 48.5 R, 29/48.5 A, 568, 42, 426.3; 408/35; 409/211, 216, 217; 364/474

[56] References Cited

U.S. PATENT DOCUMENTS

| | | | |
|---|---|---|---|
| 3,473,419 | 10/1969 | Ollearo | 408/35 |
| 4,223,579 | 9/1980 | Stack et al. | 408/35 X |
| 4,237,595 | 12/1980 | Kitamura | 29/26 A |
| 4,355,446 | 10/1982 | Shimajiri et al. | 29/264 |

*Primary Examiner*—Z. R. Bilinsky
*Attorney, Agent, or Firm*—Armstrong, Nikaido Marmelstein & Kubovcik

[57] ABSTRACT

An automatic tool changer of a machine tool comprises a spindle head (4) rotatably carrying a spindle (2), and a tool magazine (40) having a plurality of tools (42). A pair of gears (46, 48), one on the spindle and the other on the magazine, are provided to drive the magazine to index it by means of the spindle drive motor (6). The two gears (46, 48) are engaged upon the tool changing operation and disengaged upon the machining operation. The Gear engaging and disengaging are effected by the relative axial movement of the spindle head (4) and an associated slider (30) carrying the magazine (40).

9 Claims, 2 Drawing Figures

AUTOMATIC TOOL CHANGER OF A MACHINE TOOL

FIELD OF THE INVENTION

The present invention relates to an automatic tool changer of a machine tool.

BACKGROUND OF THE INVENTION

In an automatic tool changer of a machine tool, it is important that several requirements be satisfied, for example, the structure be simple, the operation reliable, and the tool changing time short. There are known automatic tool changers in which the indexing of the tool magazine is effected by utiliztion of the spindle drive motor. Such known changers, however, have not fully satisfied the above-mentioned requirements.

SUMMARY OF THE INVENTION

It is an object of the present invention to provide an automatic tool changer of a machine tool, which is simple in construction, reliable in operation, and able to change tools in a short period of time, by utilizing a spindle motor for the indexing of a tool magazine.

An automatic tool changer of a machine tool, according to the invention, comprises a spindle head rotatably carrying a spindle onto which a first gear is rigidly mounted, a tool magazine having a plurality of tools around its center axis, onto which magazine a second gear is rigidly coaxially mounted, and means for engaging and disengaging the two gears so that they are disengaged during the machining operation and engaged during the tool changing operation, thereby enabling magazine indexing by means of a motor which drives the spindle.

This arrangement is advantageous in that the mechanism for transmitting the movement from the spindle to the tool magazine can be simple, since only two gears are required to transmit the movement therebetween. It is also advantageous in that reliable control for magazine indexing can be attained since the spindle motor can be easily controlled by numerical control.

The means for engaging and disengaging the two gears preferably makes use of the relative axial movement between the tool magazine and the spindle head. More preferably, this relative axial movement is effected by actuating only the spindle head in the axial direction.

This is advantageous for changing the tools in a short period of time, wherein both the operation for removing one tool from and putting another tool onto the spindle and the operation for engaging and disengaging the two gears to bring the machine tool in the machining position and tool changing position are carried out during a single axial movement of the spindle head.

Other objects and advantages of the present invention will be apparent to those skilled in the art from a reading of the following brief description of the drawings, the detailed description of the invention, and the appended claims.

DETAILED DESCRIPTION OF THE INVENTION

Figure 1:
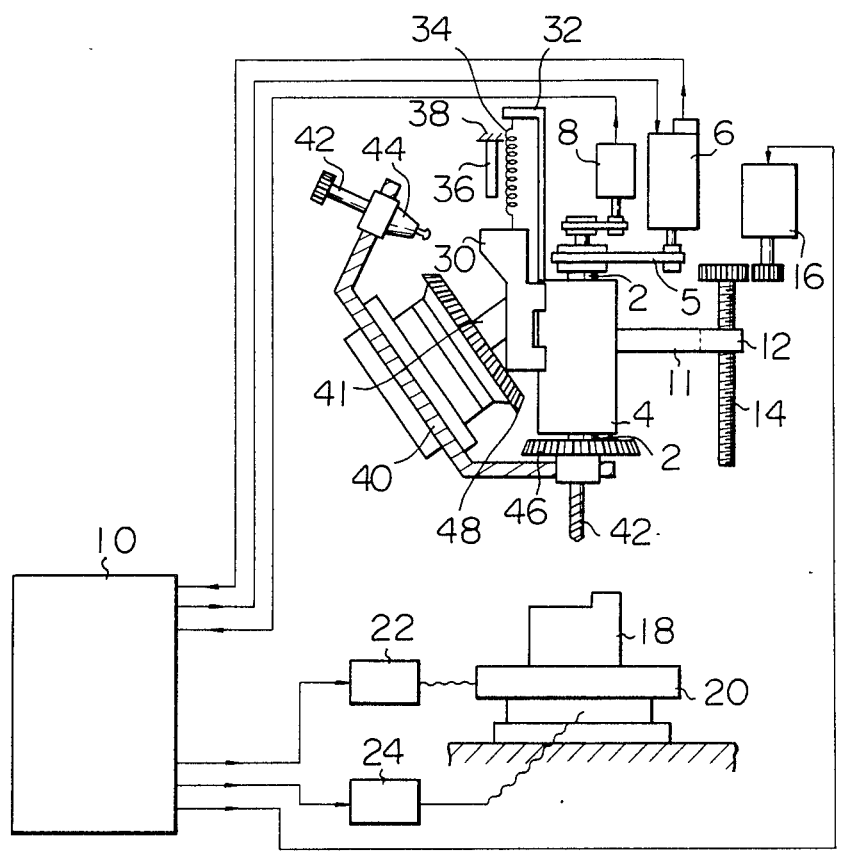
FIG. 1 is a schematic view of an automatic tool changer of a machine tool according to the invention, with the machine tool being in the machining condition.

The figures show a machining center. The frame means has been deleted to clarify the description, but the characteristic feature as a whole will be easily understood by those skilled in the art from the arrangement of main components shown.

A spindle 2 is rotatably carried on a spindle head 4 and driven by a spindle drive motor 6 via a belt 5. The spindle 2 is also connected to a position coder 8. The spindle drive motor 6 and position coder 8 are electrically connected to a numerical control unit 10.

The spindle head 4 has a nut 12 fixed thereon via a support member 11, which nut mates with a feed screw 14, and is driven vertically upward or downward by a motor 16 (hereinafter referred to as the Z axis motor). The Z axis motor 16 is also connected to the numerical control unit 10 together with an X axis motor 22, which drives a table 20 carrying a workpiece 18 horizontally in an X axis direction, and with a Y axis motor 24, which drives the same horizontally in a Y axis direction perpendicular to the X axis direction.

A slider 30 is axially slidably carried on the spindle head 4. A prestressed spring 34 is located in tension between the slider 30 and a supporting member 32 extending from the spindle head 4, whereby the slider 30 can move integrally with the spindle head 4 under the tension of the spring 34. The spindle head 4 can move up to a predetermined upper limit together with the slider 30 for the machining operation. For the tool changing operation, the spindle head 4 can further move upward beyond the upper limit. A stopper 36 is fixedly provided on a suitable frame portion 38, this stopper being disposed so that it can abut and stop the slider 30 which moves upward together with the spindle head 4 beyond the upper limit upon the tool changing operation.

The slider 30 has fixed thereon at a certain inclination a shaft 41 for supporting the tool magazine 40. The shaft 41 supports the tool magazine 40 rotatably. The tool magazine 40 has a plurality of tools 42 at its periphery at constant intervals. Each tool 42 is provided with an arbor 44 which is adapted to be clamped in the taper portion (not shown) of the spindle 2. The spindle 2 and the tool magazine 40 are disposed in related positions so that an axis of a selected tool can be made coaxial with the axis of the spindle 2, thus the tool-removing and reclamping operation can be carried out during the upward and downward motion of the spindle 2.

A bevel gear 46 is rigidly mounted onto the spindle 2. Another bevel gear 48 is rigidly coaxially mounted onto the tool magazine 40. These gears are disposed so that they are disengaged during the machining operation, as shown in FIG. 1, and are engaged during the tool changing operation, as shown in FIG. 2, by means of the relative axial movement between the spindle head 4 and the tool magazine 40, described below.

The operation of the automatic tool changer according to the invention is as follows. During the machining operation, as shown in FIG. 1, the gears 46 and 48 are not engaged and the spindle drive motor 6 drives the selected tool 42. The magazine 40 is fixedly secured to the spindle head 4 under the tension of the spring 34 and can move together with the spindle head. Thus the magazine 40 is kept free from the selected tool 42. The Z axis motor 16 drives the spindle head 4 in the Z axis direction below the above-mentioned upper limit in accordance with the control of the numerical control unit 10 so as to carry out the machining.

When changing the tools, the spindle head 4 is moved upward to the upper limit and the orientation of the spindle 2 is effected by the spindle drive motor 6. The spindle head 4 is then moved upward by the Z axis motor 16, causing the arbor 44 to be loosened from the taper portion of the spindle, then the slider 30 abuts the stopper 36. The slider 30 stops at this position while the spindle head 4 goes further upward sliding with respect to the slider 30. During this further movement, the tool 42 is detached from the taper portion of the spindle 2 and carried on the magazine 40 there, as shown in FIG. 2. When the spindle head 4 reaches a predetermined uppermost position, the gear 48 fixed to the magazine 40 mates with the gear 46 fixed to the spindle, as shown in FIG. 2. As stated, the detachment of the tool and mating of the gears are established almost simultaneously during a single linear motion of the spindle head 4. At this position, the spindle motor 6 can index the tool magazine via the gears 46 and 48, with the position coder 8 detecting the amount of the rotation.

Figure 2:
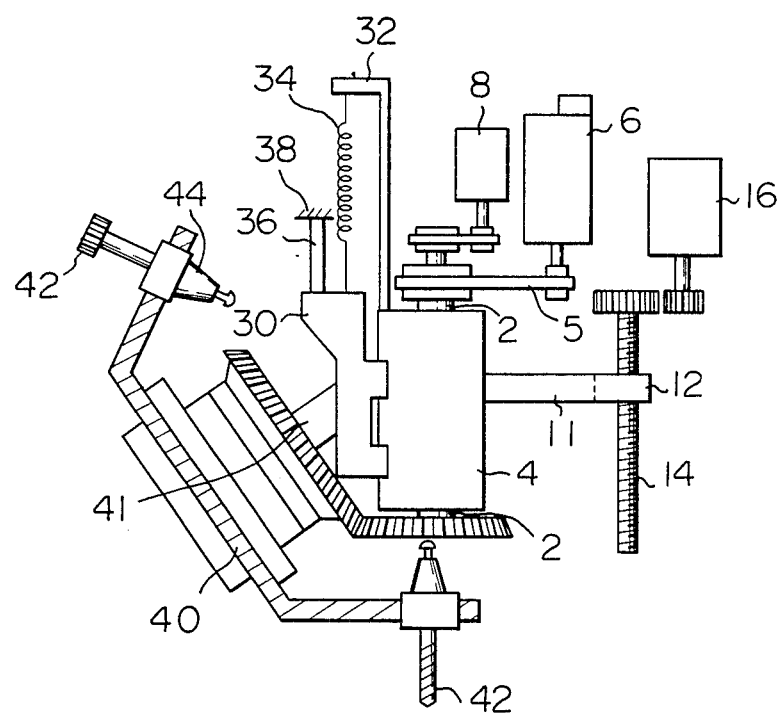
FIG. 2 is a similar schematic view, with the machine tool being in the tool changing condition.

After a new selected tool comes on the spindle axis, the spindle head 4 is lowered in a manner reverse to the above-described motion, placing the machine tool in the machining condition, as shown in FIG. 1.

We claim:

1. An automatic tool changing device for a machine tool comprising a spindle head movable in an axial direction and rotatably carrying a spindle, a tool magazine having a center axis and a plurality of tools arranged around said center axis and positioned so that an axis of a selected one of said tools can be made coaxial with an axis of said spindle, a first electric motor for rotatably driving said spindle, a second electric motor for axially feeding said spindle head, and control means for controlling said first and second motors, said changing device comprising:
   a first gear rigidly mounted on said spindle;
   a second gear rigidly mounted coaxially on said tool magazine; and
   support means for supporting said tool magazine on said spindle head to allow relative movement between said tool magazine and said spindle head to a first position that will bring said two gears into direct engagement with each other during a tool changing operation or to a second position where said two gears will be disengaged from each other during a machining operation, whereby said tool magazine will be rotated together with said spindle by said first motor for indexing said tool magazine when said two gears are engaged and only said spindle will be rotated by said first motor when said two gears are disengaged.

2. An automatic tool changer according to claim 1, wherein said machine tool can perform a machining operation when said spindle head is driven to said second position and said machine tool can perform a tool change operation when said spindle head is driven to said first position.

3. An automatic tool changer according to claim 1, wherein a means for detecting the position of the tools on said magazine is provided to index said magazine.

4. An automatic tool changer according to claim 3, wherein said position detecting means comprises a position coder connected to said spindle, thereby enabling magazine indexing by means of said spindle drive motor via said spindle and said gears.

5. An automatic tool changer according to claim 1, wherein rotational position of said spindle drive motor is numerically controlled.

6. A device according to claim 1, wherein said support means comprises means for axially slidably carrying said magazine on said spindle head and means for keeping said magazine axially fixed relative to said spindle head during a machining operation.

7. A device according to claim 6, wherein said carrying means comprises a slider which is axially slidably mounted on said spindle head and rotatably carries said magazine.

8. A device according to claim 7, wherein said magazine is inclined to said spindle head and said two gears are bevel gears.

9. A device according to claim 7, wherein said means for keeping said magazine axially fixed comprises a prestressed spring under tension between said slider and said spindle head and a fixed stopper disposed so that it will abut and stop said slider when said spindle head is fed by said second motor beyond a predetermined limit.

\* \* \* \* \*